Feb. 7, 1933. R. OPPENHEIM 1,896,786

GASOLINE ATOMIZER FOR INTERNAL COMBUSTION ENGINES

Filed Oct. 30, 1928

INVENTOR
René Oppenheim
by [signature]
ATTORNEY

Patented Feb. 7, 1933

1,896,786

UNITED STATES PATENT OFFICE

RENÉ OPPENHEIM, OF GENNEVILLIERS, FRANCE, ASSIGNOR TO SOCIÉTÉ ANONYME LE CARBONE, OF GENNEVILLIERS, FRANCE

GASOLINE ATOMIZER FOR INTERNAL COMBUSTION ENGINES

Application filed October 30, 1928, Serial No. 316,061, and in France April 23, 1928.

This invention relates to carbureters and atomizers for internal combustion engines, with particular reference to that class wherein a porous body is interposed between a fuel feeding nozzle and limited atomizing air supply on the one hand, and the intake of the engine, so that said porous body will serve to break up and comminute the drops of the fuel and thereby greatly accelerate the evaporation thereof when the engine is run normally, and when retarded will still serve to comminute the fuel droplets and promote evaporation thereof.

It is known that very porous bodies promote the emulsion of liquids in gases and, when these porous bodies are subjected to the action of a current of air saturated with a volatile liquid, the evaporation of this latter is accelerated.

The present invention has for object the application of this principle to the feeding of fuel to internal combustion engines.

For that purpose, the invention consists essentially in interposing in the gasoline conduit a very porous body, such as, for instance, porous carbon. The gasoline, the afflux of which is regulated in a known manner, for instance by means of a calibrated orifice (spraying nozzle), is mixed with a certain quantity of air which atomizes it into very fine drops. This emulsion then passes through the porous body before entering the inlet conduit of the engine. Owing to the large surface of contact of the porous body with the air, the gasoline is very rapidly atomized. The mixture admitted to the engine is in a gaseous condition instead of being in the form of a mist, as in the apparatus usually utilized.

By this means a better utilization of the fuel is obtained and consequently an increase in the efficiency of the engine.

On the other hand, when working at slow speed, the porous body becomes filled with gasoline and, at the moment of acceleration, restitutes the quantity of gasoline strictly necessary for obtaining a mixture well carburetted. This avoids the waste of gasoline owing to the sudden arrival into the inlet conduit, of the reserve of liquid gasoline contained in the usual carburettors.

It is seen by this fact that the engine accelerates again much more easily.

As a practical method of carrying out the invention, it can be stated that the gasoline, after its passage through the spraying nozzle, is mixed with a small quantity of air strictly necessary for ensuring its atomization. After passing through the porous carbon, the mixture obtained enters the narrow portion of a Venturi tube serving to regulate the main air inlet and thus becomes diluted.

It is obvious that, without changing the principle of the invention, the porous body may be placed after the main air inlet and all of the carburetted mixture may be then passed through it.

The porous carbon may be either activated carbon or nonactivated carbon, according to the applications.

In the case of activated carbon, the chemical actions which it is capable of exerting on the bodies put in contact with it, are added to the physical actions, such as incorporation and diffusion in air or other gas.

In order that the invention may be clearly understood various forms of construction of the apparatus are illustrated, by way of example only, in the accompanying diagrammatical drawing.

Figure 1:
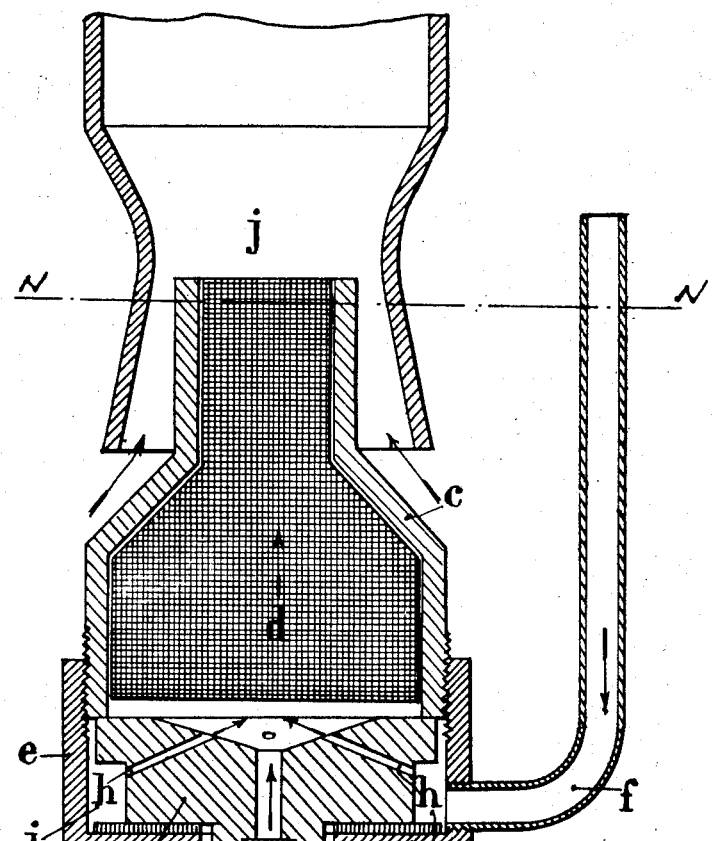
Figure 1 is a vertical cross-section through the gasoline atomizer.

In that form of the invention disclosed in Fig. 1, the apparatus is screwed on the gasoline conduit or feed pipe $a$, for instance coming from a constant level tank, not shown; $b$ is a calibrated orifice or spraying nozzle adapted to limit the outflow of the fuel from the conduit or feed pipe.

The apparatus proper comprises a cylindro-conical casing $c$ containing porous carbon $d$. This casing $c$ is screwed on a flange $e$ carrying a tube $f$ adapted to feed the atomizing air. A member $g$, the form of which is clearly seen in the drawing, is screwed on the gasoline inlet conduit $a$ and serves to support the flange $e$ on which is then screwed the cylindro-conical casing. This member $g$ is provided with air supply means in the form of small channels $h$ opening into an annular chamber $i$ formed between the member $g$ and the flange $e$.

This annular chamber $i$ communicates with the exterior by the tube $f$ and the channels $h$ serve for regulating the admission of the atomizing air under the porous carbon.

The upper end of the casing $c$ opens, as stated above, into the narrow portion of a Venturi tube $j$ carried by the inlet conduit of the engine.

The operation is as follows:

The gasoline leaving the calibrated spraying nozzle $b$ encounters the jets of air coming from the channels $h$, thus producing a preliminary atomization of the gasoline. The gasoline mixed with the small quantity of air thus introduced, passes through the porous carbon $d$ where it is completely atomized. The gasoline vapors then mix with the main air entering in the Venturi tube $j$ and are admitted to the engine.

It is, of course understood that the suction of the intake of the engine takes full effect in the Venturi tube and draws in air past the carbon, so that the suction is also effective to an appreciable degree about said carbon, due to the fact that the calibrated orifice in the nozzle as well as the air channels are designed to exactly limit both fuel and air supply at their respective points. The carbon is thus disposed in the path of the suction to a greater or lesser degree, the greater suction tending to prevent any considerable degree of saturation of the carbon during acceleration of the engine, the lesser degree of suction allowing the carbon to become more saturated with fuel when the engine is retarded, while during normal operation of the engine, the carbon in less saturated or wet condition efficiently homogenizes the atomized fuel and air and transforms the same into a rich vapor ready for further air dilution in the Venturi tube. When the engine is stopped, the level of the fuel will tend to rise so as to in fact saturate and practically immerse the carbon, the level rising in tube $f$ as well as about the carbon to about the height indicated at N—N in Fig. 1.

As already indicated, in the speed reducing period, as long as the calibrated jet delivers sufficient fuel, the carbon remains saturated.

When however the suction increases, the supply to the nozzle $b$ will become insufficient by simple gravity, and the suction will not only be transmitted to the nozzle $b$ but likewise through the channels $h$ to the fuel contained in the cavity $i$ and in the tube $f$. The level of the fuel then sinks in tube $f$ until the moment is reached where the tube has become completed empty, when air is exhausted and emulsion begins through the channels $h$ of the jet of combustible coming from the calibrated inlet $b$.

At that moment it is an emulsion and air that traverses the carbon.

In the arrangement just described, a block of carbon is illustrated which does not extend beyond the edge of the metallic casing containing it.

Figure 3:
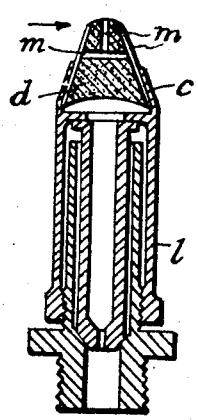
Figure 3 is a vertical cross-section of the gasoline atomizer as adapted for horizontal carbureters.
Figure 4:
Figure 4 is a cross-section of still another modified form of the porous body.
Figure 2:
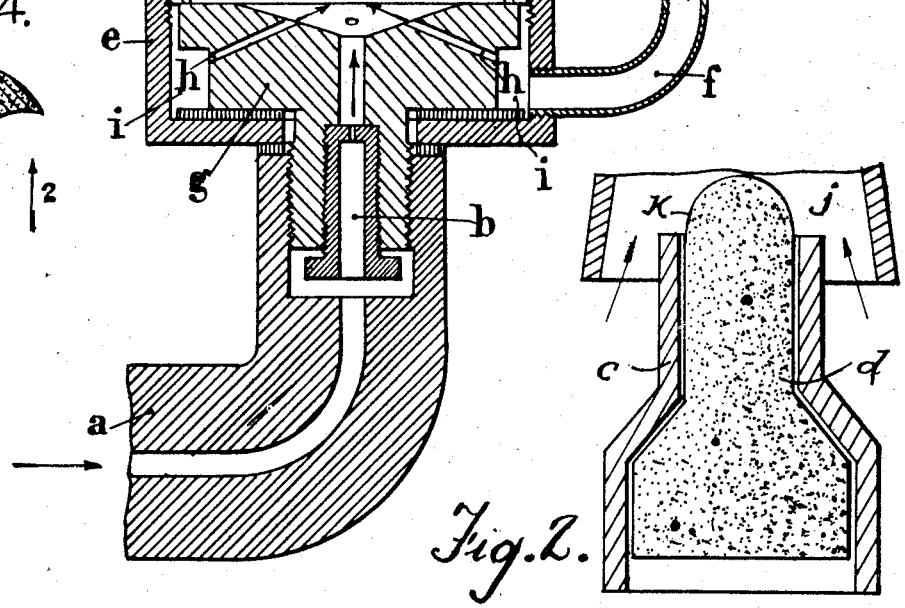
Figure 2 is a vertical cross-section through the gasoline atomizer having a modified form of porous body.

In the arrangements of Figs. 2, 3 and 4, the porous body is given such a shape that it extends beyond the casing containing it. As a result of this arrangement, the first streams of air which pass, upon the opening of the throttle valve, will lick this small uncovered porous body which is soaked with fuel, ensuring easy acceleration of the engine.

In the example shown in Fig. 2, the porous body block $d$ which may be of carbon or any other sufficiently porous body, slightly extends beyond the end of the metallic sheath $c$ containing it.

As seen in the drawing, the air entering the Venturi tube $j$ comes in contact with the end $k$ of the porous mass. Consequently, at the moment the engine accelerates, the first streams of air which pass, when the throttle valve is opened, come in contact with the end $k$ of the mass soaked with fuel. These streams become loaded with vapors or molecules of gasoline and ensure prompt acceleration without interruption.

Moreove, this invention has the advantage of allowing the use of a much larger Venturi tube than ordinarily consequently causing less contraction of the gaseous stream and thus obtaining a larger flow of vapor resulting in an increase in power.

Fig. 3 shows how the sheath $c$ can be made integral with a casing for the spraying nozzle $l$. This arrangement is more particularly applicable in the case of a horizontal carburettor.

The air passes in front of the spraying nozzle according to the arrow 1.

In the case of a vertical carburettor, the porous body can have the shape of a mushroom as shown at $D^1$, Fig. 4, so as to increase the surface of contact between the streams of air indicated by the arrows 2, and the porous body.

Another modification of the invention consists in forming small channels $m$ in the porous material, Fig. 3, so as to ventilate said porous material and thereby allow a more abundant afflux of the gasoline or other fuel, especially in case the porous body is constituted by a material which does not possess a high degree of porosity.

The channels m, Fig. 3, may be formed in the porous blocks of the various arrangements described.

The above described arrangements are given by way of example only; the forms, materials, dimensions and all details of construction may, of course, be varied without departing from the principle of the present invention.

I claim:

1. An apparatus for cold vaporization of volatile fuel feedable to the intake of an internal combustion engine, including the combination, with a suction intake associated with said engine and a fuel feed pipe, of a casing communicating with said feed pipe and provided with a calibrated nozzle limiting the flow of fuel from said feed pipe into said casing in predetermined manner, air supply means associated with said casing for introducing a limited supply of air into said casing beyond said nozzle in order to atomize the fuel flowing from said nozzle, and a porous body occupying an opening in said casing in a position beyond said nozzle and air supply means in the path of the atomized fuel, and a projection upon said porous body extending beyond said casing into an exposed position relatively adjacent to the intake of said engine, so that when the speed of the engine is retarded, the suction of said intake will be weak so as to permit said porous body to become saturated with fuel, and when the speed of said engine is accelerated, the suction of said intake will be increased and will draw air past said projection and tend to dry said porous body and also cause the atomized fuel from within said casing to traverse said porous body and become further diluted by said air.

2. An apparatus for cold vaporization of volatile fuel feedable to the intake of an internal combustion engine, including the combination, with a suction intake associated with said engine and a fuel feed pipe, of a casing communicating with said feed pipe and provided with a calibrated nozzle limiting the flow of fuel from said feed pipe into said casing in predetermined manner, air supply means associated with said casing for introducing a limited supply of air into said casing beyond said nozzle in order to atomize the fuel flowing from said nozzle, and a ventilated porous body occupying an opening in said casing in a position beyond said nozzle and air supply means in the path of the atomized fuel, and a projection upon said porous body extending beyond said casing into an exposed position relatively adjacent to the intake of said engine, so that when the speed of the engine is retarded, the suction of said intake will be weak so as to permit said porous body to become saturated with fuel, and when the speed of said engine is accelerated, the suction of said intake will be increased and will draw air past said projection and tend to dry said porous body and also cause the atomized fuel from within said casing to traverse said porous body and become further diluted by said air.

3. An apparatus for cold vaporization of volatile fuel feedable to the intake of an internal combustion engine, including the combination, with a suction intake associated with said engine and a fuel feed pipe, of a casing communicating with said feed pipe and provided with a calibrated nozzle limiting the flow of fuel from said feed pipe into said casing in predetermined manner, air supply means associated with said casing for introducing a limited supply of air into said casing beyond said nozzle in order to atomize the fuel flowing from said nozzle, and a ventilated body of activated carbon arranged beyond said nozzle and air supply means in the path of the atomized fuel and also in such relatively adjacent position with respect to said intake, that when said engine is retarded in speed, the suction of said intake will be relatively weak and will permit said activated carbon body to become saturated with fuel, and when said engine is accelerated in speed, the suction of said intake will be increased and will draw air past said activated carbon body and tend to dry the same and also cause the atomized fuel from within said casing to traverse said activated carbon body.

4. An apparatus for cold vaporization of volatile fuel feedable to the intake of an internal combustion engine, including the combination, with a suction intake associated with said engine and a fuel feed pipe, of a casing communicating with said feed pipe and provided with a calibrated nozzle limiting the flow of fuel from said feed pipe into said casing in predetermined manner, air supply means associated with said casing for introducing a limited supply of air into said casing beyond said nozzle in order to atomize the fuel flowing from said nozzle, and an activated carbon body occupying an opening in said casing in a position beyond said nozzle and air supply means in the path of the atomized fuel, and a projection upon said activated carbon body extending beyond said casing into an exposed position relatively adjacent to the intake of said engine, so that when the speed of the engine is retarded, the suction of said intake will be weak so as to permit said activated carbon body to become saturated with fuel, and when the speed of said engine is accelerated, the suction of said intake will be increased and will draw air past said projection and tend to dry said activated carbon body and also cause the atomized fuel from within said casing to traverse said activated carbon body and become further diluted by said air.

5. An apparatus for cold vaporization of volatile fuel feedable to the intake of an internal combustion engine, including the combination, with a fuel feed pipe, of a dished member having calibrated means opening into the dished portion of the same and determining the flow of fuel from said feed pipe, channel means also opening into the dished portion of said dished member for supplying a limited amount of air in order to atomize the fuel issuing from said calibrated means, which channel means open in said dished portion above said calibrated means, a porous body disposed above said dished portion and the calibrated means and said channel means, and means for admitting air between said porous body and the intake of said engine.

6. An apparatus for cold vaporization of volatile fuel feedable to the intake for an internal combustion engine, including the combination, with a casing and a fuel feed pipe connected thereto, of a dished member disposed in the casing, a calibrated means in said casing opening into the dished portion of said dished member and determining the flow of fuel from said feed pipe into said dished portion in said casing, channel means opening into said dished portion in said casing for supplying a limited amount of air thereto in order to atomize the fuel entering the casing from said calibrated means, which channel means open in said dished portion above said calibrated means, a porous body in said casing disposed above said dished portion and the calibrated means and channel means therein, and means above the porous body for admitting air between said porous body and the intake of said engine.

7. An apparatus for cold vaporization of volatile fuel feedable to the intake of an internal combustion engine, including the combination, with a casing and a fuel feed pipe connected thereto of a dished member disposed in the casing, a calibrated means in said casing opening into the dished portion of said dished member and determining the flow of fuel from said feed pipe into the dished portion in said casing, a plurality of channel means opening into said dished portion in said casing for supplying a limited amount of air thereto in order to atomize the fuel entering the casing from said calibrated means, which channel means open in said dished portion above said calibrated means, a porous body in said casing disposed above said dished portion and the calibrated means and channel means therein, and means above the porous body for admitting air between said porous body and the intake of said engine.

8. An apparatus for cold vaporization of volatile fuel feedable to the intake of an internal combustion engine, including the combination, with a casing and a fuel feed pipe connected thereto, of a dished member disposed in the casing, a calibrated means in said casing opening into the dished portion of said dished member and determining the flow of fuel from said feed pipe into the dished portion in said casing, channel means opening into said dished portion in said casing for supplying a limited amount of air thereto in order to atomize the fuel entering the casing from said calibrated means, which channel means open in said dished portion above said calibrated means, a porous carbon body in said casing disposed above said dished portion and the calibrated means and channel means therein, and means above the porous body for admitting air between said porous body and the intake of said engine.

9. An apparatus for cold vaporization of volatile fuel feedable to the intake of an internal combustion engine, including the combination, with a casing and fuel feed pipe connected thereto, of a dished member disposed in the casing, a calibrated means in said casing opening into the dished portion of said dished member and determining the flow of fuel from said feed pipe into the dished portion in said casing, channel means opening into said dished portion in said casing for supplying a limited amount of air thereto in order to atomize the fuel entering the casing from said calibrated means, which channel means open in said dished portion above said calibrated means, an activated carbon body occupying an opening in said casing above said dished portion and the calibrated means and channel means therein, and means above said activated carbon body for admitting air between the same and the intake of said engine.

The foregoing specification of my "gasoline atomizer for internal combustion engines" signed by me this 18th day of October, 1928.

RENÉ OPPENHEIM.